United States Patent
Kim et al.

(10) Patent No.: US 8,212,679 B2
(45) Date of Patent: Jul. 3, 2012

(54) NEAR-FIELD RFID READER ANTENNA

(75) Inventors: Jeong-seok Kim, Daejeon-si (KR);
Won-kyu Choi, Daejeon-si (KR);
Gil-young Choi, Daejeon-si (KR);
Jong-suk Chae, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 409 days.

(21) Appl. No.: 12/507,258

(22) Filed: Jul. 22, 2009

(65) Prior Publication Data

US 2010/0141386 A1    Jun. 10, 2010

(30) Foreign Application Priority Data

Dec. 10, 2008    (KR) .................. 10-2008-0125367

(51) Int. Cl.
*G08B 13/14* (2006.01)
(52) U.S. Cl. .................. 340/572.7; 343/700 MS
(58) Field of Classification Search ............... 340/572.7; 343/700 MS, 907; 455/41.1
See application file for complete search history.

(56) References Cited

U.S. PATENT DOCUMENTS

| | | |
|---|---|---|
| 2007/0164868 A1 | 7/2007 | Deavours et al. |
| 2007/0268143 A1 | 11/2007 | Copeland et al. |
| 2008/0007457 A1 | 1/2008 | Copeland et al. |
| 2009/0146886 A1* | 6/2009 | Yoshioka et al. ...... 343/700 MS |
| 2010/0233958 A1* | 9/2010 | Washiro ...................... 455/41.1 |

FOREIGN PATENT DOCUMENTS

| | | |
|---|---|---|
| KR | 10-2006-0004932 A | 1/2006 |
| KR | 10-2006-0064457 A | 6/2006 |
| KR | 10-2006-0064473 A | 6/2006 |
| KR | 10-2007-0079295 A | 8/2007 |

\* cited by examiner

*Primary Examiner* — John A Tweel, Jr.
(74) *Attorney, Agent, or Firm* — Kile Park Goekjian Reed & McManus PLLC

(57) ABSTRACT

A near-field radio frequency identification (RFID) reader antenna is provided. The near-field RFID reader antenna is intended to separately recognize adjacent items to which a plurality of small RFID tags are attached, such as wines displayed on a shelf in a store or chip trays on casino tables, using a near field. The near-field REID reader antenna includes a dielectric layer, at least one signal line formed on the dielectric layer, a ground surface formed under the dielectric layer, at least one ground line formed under the dielectric layer to be electrically connected to the ground surface in parallel with the signal line, at least one signal stub formed to be electrically connected to the signal line toward the ground line, and at least one ground stub formed to be electrically connected to the ground line toward the signal line in parallel with the signal stub.

13 Claims, 6 Drawing Sheets

NEAR-FIELD RFID READER ANTENNA

CROSS-REFERENCE TO RELATED APPLICATION

This application claims the benefit under 35 U.S.C. §119(a) of Korean Patent Application No. 10-2008-0125367, filed on Dec. 10, 2008, the disclosure of which is incorporated herein in its entirety by reference.

BACKGROUND

1. Field

The following description relates to a near-field radio frequency identification (RFID) reader antenna, and more particularly, to a near-field RFID reader antenna for separately recognizing adjacent items to which a plurality of small RFID tags are attached, such as wines displayed on a shelf in a store or chip trays on a casino table, using its near field.

2. Description of the Related Art

Application of RFID is expanding from pallet or box tagging to item-level tagging. In general, high frequency (HF)-band RFID technology has been preferred for item-level tagging, but has problems including tag size and price, reading distance, data processing speed, compatibility with an existing ultra high frequency (UHF)-band RFID standard, and so on.

While the HF-band RFID technology uses a magnetic field coupling mechanism, UHF-band RFID technology uses backscattering of electromagnetic waves. The UHF-band RFID technology shows a reading distance of about 3 to 5 m, which is longer than that of the HF-band RFID technology, and thus has been widely used for physical distribution, material management, etc., in units of pallets or boxes.

However, in the application field of separately recognizing a large amount of densely aggregated items, the read ratio of the UHF-band RFID technology abruptly deteriorates due to scattering and interference of electromagnetic waves. To overcome this drawback of the UHF-band RFID technology in separately recognizing items, research on RFID technology using a UHF-band near field is actively under way.

When the UHF-band near field is used, the magnetic field coupling mechanism or an electric field coupling mechanism is selected according to an item to which a tag is attached and a service environment, and a large amount of items can be separately recognized, unlike the HF-band RFID technology using the magnetic field coupling mechanism.

However, according to the UHF-band near-field RFID technology, a reader antenna must be designed with a different concept from conventional far-field REID technology. In other words, each item recognition environment, a tag position, distribution of a near-field, etc., must be considered in designing the reader antenna.

Also, in order to separately recognize and manage a variety of items densely aggregated is on a display stand such as a shelf using the near-field RFID technology, a near-field must cover the entire display stand to remove a fading zone. Thus, the reader antenna needs to be designed such that an electric field and magnetic field are formed in several directions.

SUMMARY

The following description relates to a near-field radio frequency identification (RFID) reader antenna for separately recognizing adjacent items to which a plurality of small RFID tags are attached, such as wines displayed on a shelf in a store or chip trays on casino tables, using a near field.

According to an exemplary aspect, there is provided a near-field radio frequency identification (RFID) reader antenna, including a dielectric layer; at least one signal line formed on the dielectric layer; a ground surface formed under the dielectric layer; at least one ground line formed under the dielectric layer to be electrically connected to the ground surface in parallel with the signal line; at least one signal stub formed to be electrically connected to the signal line toward the ground line; and at least one ground stub formed to be electrically connected to the ground line toward the signal line in parallel with the signal stub.

Additional aspects of the invention will be set forth in the description which follows, and in part will be apparent from the description, or may be learned by practice of the invention.

It is to be understood that both the foregoing general description and the following detailed description are exemplary and explanatory and are intended to provide thither explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION

Figure 1:
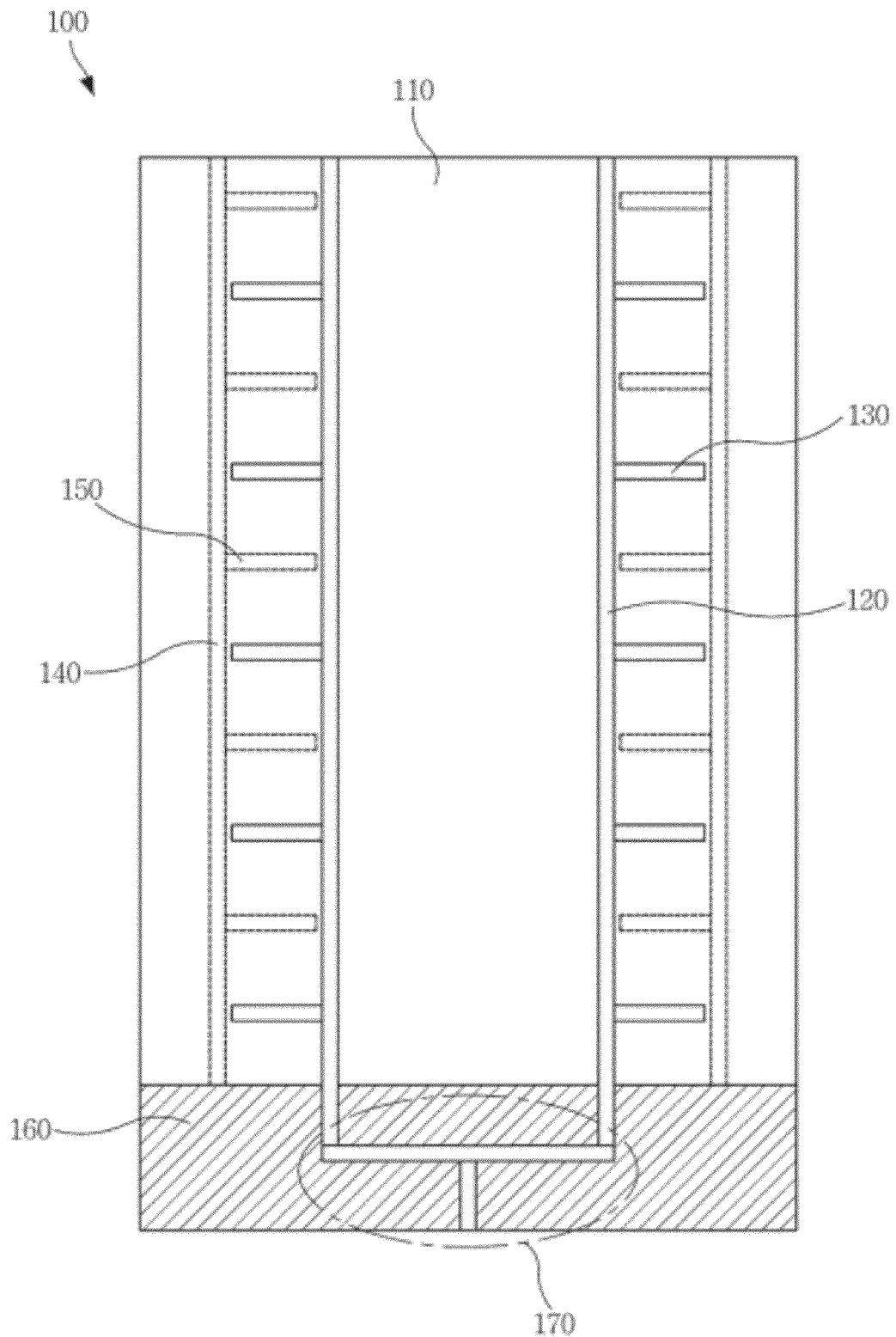
FIG. 1 is a plan view of a near-field radio frequency identification (RFID) reader antenna according to an exemplary embodiment.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view of a near-field radio frequency identification (RFID) reader antenna according to an exemplary embodiment.

Referring to FIG. 1, a near-field RFID reader antenna 100 according to an exemplary embodiment includes a dielectric layer 110, a signal line 120, a ground surface 160, a ground line 140, a signal stub 130, and a ground stub 150.

On the dielectric layer 110, the signal line 120 and the ground line 140 that will be described below are formed. The dielectric layer 110 may be a single printed circuit board (PCB).

The signal line 120 is formed on the dielectric layer 110 and generates a magnetic field and all electric field. An end of the signal line 120 is formed to be open. Feeding and matching may be performed through the signal line 120.

The ground surface 160 is formed under the dielectric layer 110.

The ground line 140 is formed under the dielectric layer 110 and electrically connected to the ground surface 160. The ground line 140 may be formed parallel to the signal line 120 such that a uniform electric field and a magnetic field are generated between the ground line 140 and the signal line 120. An end of the ground line 140 is formed to be open.

The signal stub 130 is formed to be electrically connected to the signal line 120 toward the ground line 140.

The ground stub 150 is formed to be electrically connected to the ground line 140 toward the signal line 120. The ground stub 150 may be formed parallel to the signal stub 130 such that a uniform electric field and magnetic field are generated between the ground stub 150 and the signal stub 130.

Here, the lengths of the signal stub 130 and the ground stub 150 may be equal to or shorter than a distance between the signal line 120 and the ground line 140. When the length of the signal stub 130 is longer than the distance between the ground line 140 and the signal line 120 and thus formed to cross the ground line 140, a part of the signal stub 130 formed beyond the ground line 140 may not be adjacent to the ground stub 150. In other words, the ground stub 150 does not correspond to the part of the signal stub 130 formed beyond the ground line 140, and thus a uniform electric field and magnetic field cannot be generated.

Meanwhile, there may be two or more of the signal stubs 130 and the ground stubs 150. In this case, the ground stubs 150 are formed to be adjacent to the signal stubs 130 and correspond to the signal stubs 130 one to one. The signal stubs 130 and the ground stubs 150 serve to uniformly generate electric fields and magnetic fields.

Meanwhile, in another example of the near-field RFID reader antenna 100 according to an exemplary embodiment, two or more of the signal lines 120 may be arranged.

Figure 2:
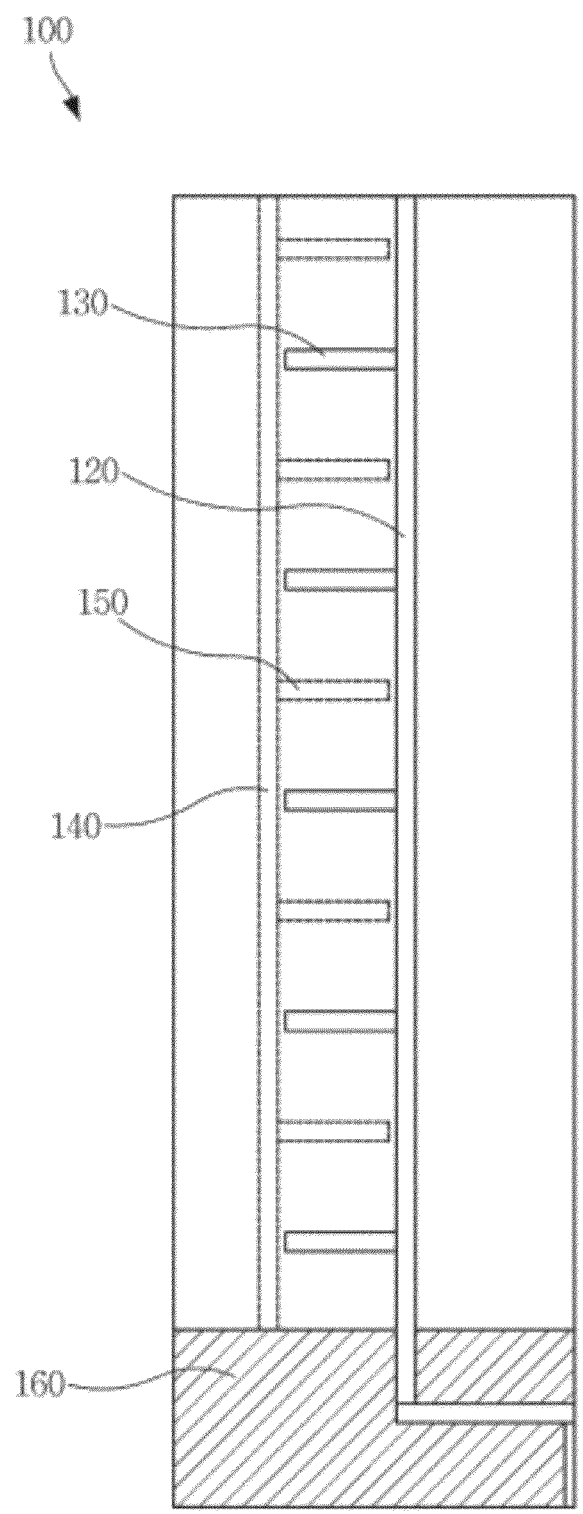
FIG. 2 is a plan view of a near-field RFID reader antenna according to another exemplary embodiment.

FIG. 2 is a plan view of a near-field RFID reader antenna according to another exemplary embodiment.

As illustrated in FIG. 2, two signal lines 120 are formed on a dielectric layer 110. A plurality of ground lines 140 are formed to be arranged adjacent to the signal lines 120 and correspond to the signal lines 120 one to one.

Here, the near-field RFID reader antenna 110 may additionally include a feeding line 170.

The feeding line 170 consists of the signal lines 120 connected in parallel. The feeding line 170 parallel-feeds the signal lines 120. In this case, the signal lines 120 have the same length and thus are supplied with equally divided power through the feeding line 170. Also, the ground lines 140 have the same length. The near-field RFID reader antenna 100 constituted as described above can further uniformize the phases of an electric field and magnetic field formed around the signal lines 120 and the ground lines 140.

Meanwhile, a resonant frequency or amount of field coupling may be controlled by selected one of a distance between the signal lines 120 and the ground lines 140, a distance between signal stubs 130 and ground stubs 150, a distance between the signal stubs 130, a distance between the ground stubs 150, a distance between the ground stubs 150 and the signal lines 120, a distance between the ground stubs 150 and the ground lines 140, a distance between the signal stubs 130 and the signal lines 120, and a distance between the signal stubs 130 and the ground lines 140.

Figure 3:
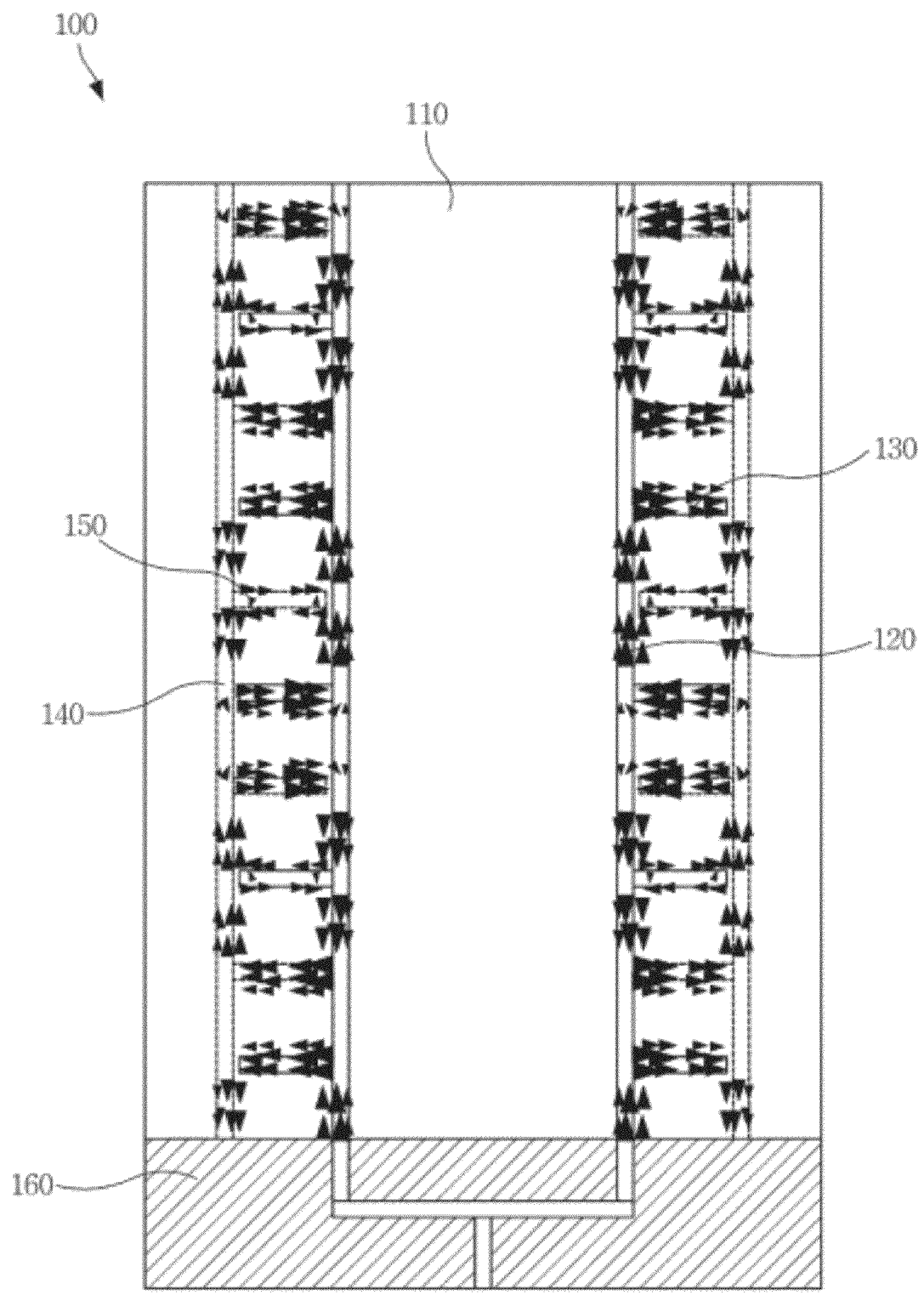
FIG. 3 illustrates current distribution in ground lines, signal lines, signal stubs, and ground stubs of the near-field RFID reader antenna shown in FIG. 2.

FIG. 3 illustrates current distribution in the ground lines 140, the signal lines 120, the signal stubs 130, and the ground stubs 150 of the near-field RFID reader antenna 100 shown in FIG. 2.

As illustrated in FIG. 3, when the near-field RFID reader antenna 100 constituted as described above according to an exemplary embodiment is fed, standing waves are formed in the signal lines 120 and the ground lines 140 whose ends are open. And, currents flow through each pair of the signal line 120 and the ground line 140 in opposite directions, and electric fields are generated between each pair of the signal line 120 and the ground line 140. Also, a magnetic field is formed around each of the signal lines 120 and the ground lines 140 in the same direction as the currents. The electric fields and magnetic fields are formed in several directions between the signal stubs 130 and the ground stubs 150, between the signal stubs 130, between the ground stubs 150, between the signal stubs 130 and the ground lines 140, between the signal stubs 130 and the signal lines 120, between the ground stubs 150 and the ground lines 140, and between the ground stubs 150 and the signal lines 120.

Here, currents flow through each pair of the signal line 120 and the ground line 140 in opposite directions, and magnetic fields are generated by the currents in opposite directions. Thus, the magnetic field generated from the signal line 120 and the magnetic field generated from the ground line 140 cancel each other in a region beyond a near field and do not reach a long distance. Also, magnetic fields are generated from the signal stubs 130 and the ground stubs 150, but are weak because the lengths of the signal stubs 130 and the ground stubs 150 are short. Furthermore, currents supplied to the signal subs 130 and the ground stubs 150 flow in opposite directions and the magnetic fields are in opposite directions. For these reasons, the magnetic fields cannot reach a remote site. Consequently, the near-field RFID reader antenna 100 according to an exemplary embodiment uniformly generates electric fields and magnetic fields within a near field only.

Figure 4:
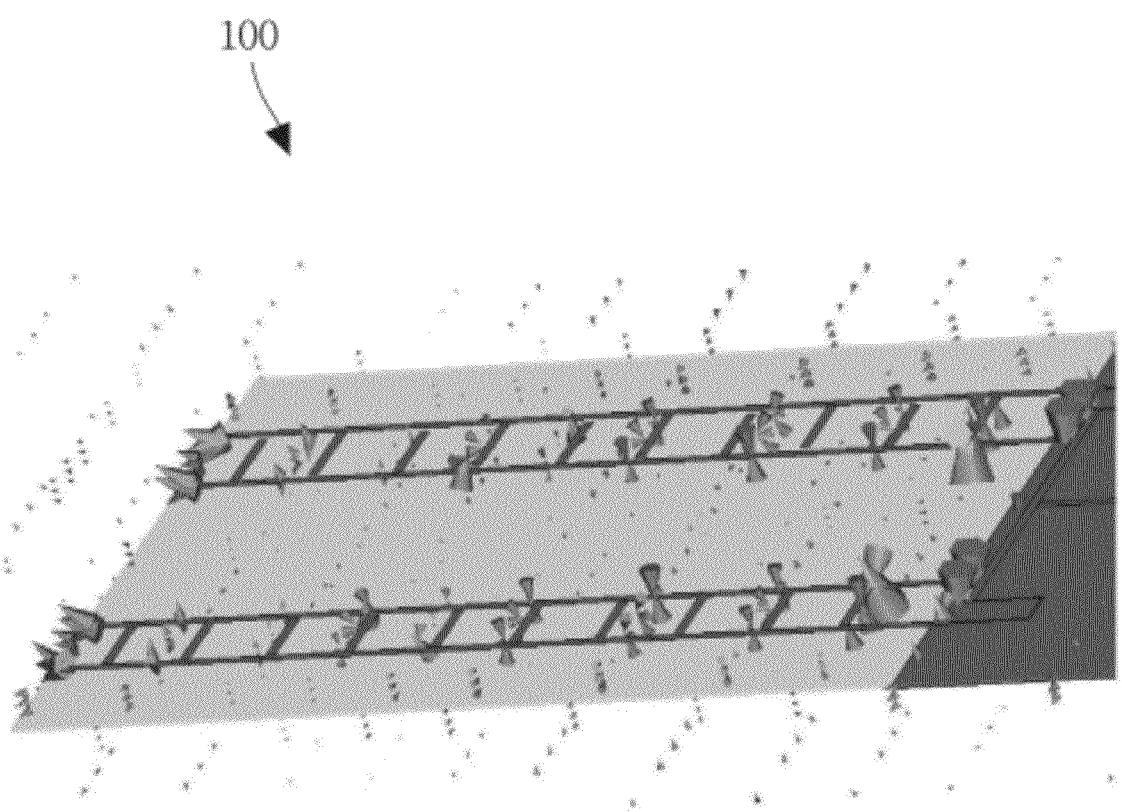
FIG. 4 illustrates electric field distribution in the near-field RFID reader antenna shown in FIG. 2.
Figure 5:
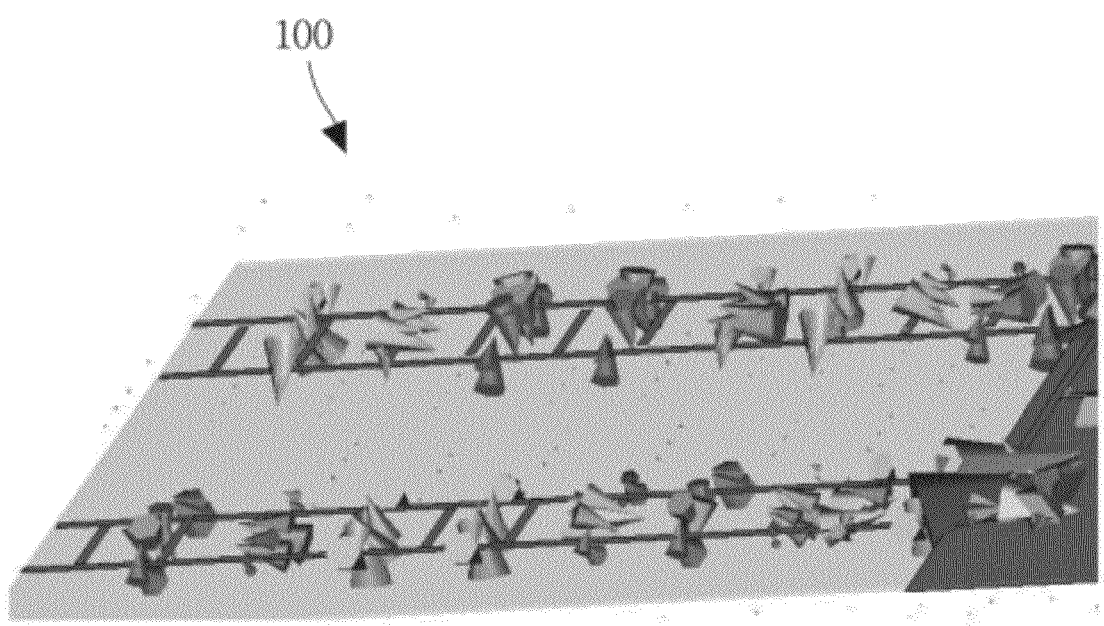
FIG. 5 illustrates magnetic field distribution in the near-field RFID reader antenna shown in FIG. 2.

FIG. 4 illustrates electric field distribution in the near-field RFID reader antenna shown in FIG. 2, and FIG. 5 illustrates magnetic field distribution in the near-field RFID reader antenna shown in FIG. 2.

After the near-field RFID reader antenna is fed, the electric field distribution is measured using an electric field measuring device, and the magnetic field distribution is measured using a magnetic field measuring device.

As illustrated in FIGS. 4 and 5, the near-field RFID reader antenna uniformly generates electric fields or magnetic fields in several directions within a near field, and thus reads a tag adjacent to the antenna but does not read a tag at a long distance. Also, since a fading zone is not generated within the near field due to the uniformly generated electric fields and magnetic fields, the near-field RFID reader antenna can improve the reliability of reading an RFID tag within the near field.

The near-field RFID reader antenna according to an exemplary embodiment can be used in bookshelves for managing books, conveyer belts or shelves for managing medical supplies, shelves for managing various items in a large store, chip trays for managing casino chips, etc., but the use is not limited to these. The near-field RFID reader antenna can be applied to any environment for recognizing a large amount of various items within a short distance.

Figure 6:
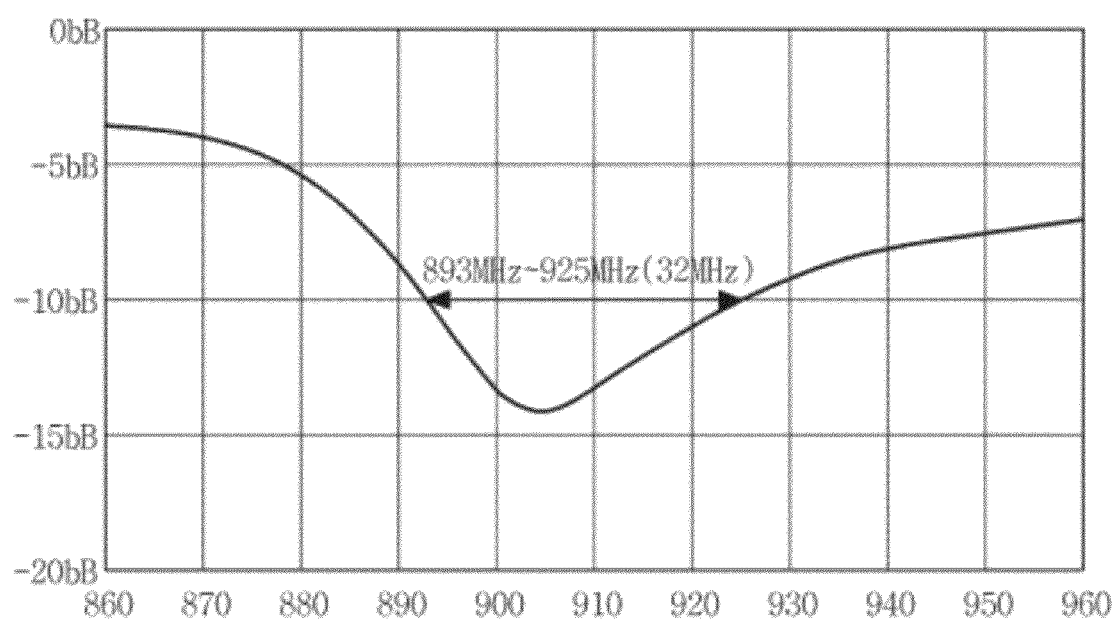
FIG. 6 is a graph showing bandwidth depending on return loss of the near-field RFID reader antenna shown in FIG. 2.

FIG. 6 is a graph showing bandwidth depending on return loss of the near-field RFID reader antenna shown in FIG. 2.

The near-field RFID reader antenna according to an exemplary embodiment shows a bandwidth of 32 MHz with respect to −10 dB. It can be seen from FIG. 6 that the near-field RFID reader antenna according to an exemplary embodiment can be used as an ultra high frequency (UHF)-band RFID reader antenna for a generally used frequency, that is, about 900 MHz.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A near-field radio frequency identification (RFID) reader antenna, comprising:
    a dielectric layer;
    at least one signal line formed on the dielectric layer;
    a ground surface formed under the dielectric layer;
    at least one ground line formed under the dielectric layer to be electrically connected to the ground surface in parallel with the signal line;
    at least one signal stub formed to be electrically connected to the signal line toward the ground line; and
    at least one ground stub formed to be electrically connected to the ground line toward the signal line in parallel with the signal stub.

2. The near-field RFID reader antenna of claim 1, wherein two or more of the signal stubs are arranged, and two or more of the ground stubs are formed to be arranged adjacent to the signal stubs and correspond to the signal stubs one to one.

3. The near-field RFID reader antenna of claim 1, wherein two or more of the signal lines are arranged, and two or more of the ground lines are formed to be arranged adjacent to the signal lines and correspond to the signal lines one to one.

4. The near-field RFID reader antenna of claim 3, further comprising a feeding line consisting of the signal lines connected in parallel and supplying electricity to the signal lines.

5. The near-field RFID reader antenna of claim 3, wherein the signal lines have the same length.

6. The near-field RFID reader antenna of claim 3; wherein the ground lines have the same length.

7. The near-field RFID reader antenna of claim 1, wherein an end of the signal line is formed to be opened.

8. The near-field RFID reader antenna of claim 1, wherein all end of the ground line is formed to be opened.

9. The near-field RFID reader antenna of claim 1, wherein lengths of the signal stub and the ground stub are equal to or shorter than a distance between the signal line and the ground line.

10. The near-field RFID reader antenna of claim 1, wherein at least one of a resonant frequency and an amount of field coupling is controlled by a distance between the signal line and the ground line.

11. The near-field RFID reader antenna of claim 1, wherein at least one of a resonant frequency and an amount of field coupling is controlled by a distance between the signal stub and the ground stub.

12. The near-field RFID reader antenna of claim 1, wherein at least one of a resonant frequency and an amount of field coupling is controlled by a distance between the signal stubs.

13. The near-field RFID reader antenna of claim 1, wherein at least one of a resonant frequency and an amount of field coupling is controlled by a distance between the ground stubs.

* * * * *